United States Patent [19]

Cooper et al.

[11] Patent Number: 6,110,518
[45] Date of Patent: Aug. 29, 2000

[54] METHOD FOR PREPARING QUICK-RECONSTITUTING FOODSTUFFS WHICH INCLUDES SUBJECTING SUCH FOODSTUFFS TO FREEZING FOLLOWED BY THAWING AND THEN AT LEAST ONE SEQUENCE OF FREEZING AND THAWING PRIOR TO DRYING

[75] Inventors: Kern L. Cooper, Pocatello; Mark Call, Blackfoot; Warren Simon, Idaho Falls, all of Id.; Susan Linscott, Maple Grove, Minn.

[73] Assignee: Basic American, Inc., Blackfoot, Id.

[21] Appl. No.: 09/038,627

[22] Filed: Mar. 12, 1998

[51] Int. Cl.⁷ .............................. A23C 1/06; A23B 4/03; A23L 1/216
[52] U.S. Cl. ..................... 426/385; 426/443; 426/444; 426/637
[58] Field of Search ................................ 426/385, 443, 426/444, 637

[56] References Cited

U.S. PATENT DOCUMENTS

| | | |
|---|---|---|
| 2,278,472 | 4/1942 | Musher . |
| 2,439,119 | 4/1948 | Willetts . |
| 2,490,431 | 12/1949 | Green et al. . |
| 2,523,552 | 9/1950 | Birdseye . |
| 2,572,762 | 10/1951 | Rivoche . |
| 2,705,679 | 4/1955 | Griffiths et al. . |
| 2,707,684 | 5/1955 | McCready et al. . |
| 2,713,003 | 7/1955 | Rivoche . |
| 2,723,202 | 11/1955 | Rivoche . |
| 2,729,566 | 1/1956 | Harrington . |
| 2,813,796 | 11/1957 | Kerneaster . |
| 3,188,750 | 6/1965 | Davis . |
| 3,338,724 | 8/1967 | Katucki . |
| 3,359,123 | 12/1967 | Katucki . |
| 3,438,792 | 4/1969 | Kruger . |
| 3,573,070 | 3/1971 | Smith et al. . |
| 3,644,129 | 2/1972 | Sloan . |
| 3,973,047 | 8/1976 | Unaberry et al. . |
| 3,989,855 | 11/1976 | Jones et al. . |
| 4,002,772 | 1/1977 | Haas . |
| 4,084,008 | 4/1978 | Yuch et al. . |
| 4,110,474 | 8/1978 | Lagow et al. . |
| 4,889,734 | 12/1989 | Shatila . |

*Primary Examiner*—Anthony J. Weier
*Attorney, Agent, or Firm*—Henderson & Sturm LLP

[57] ABSTRACT

A method for producing a quick-reconstituting foodstuff including thawing previously frozen foodstuff under conditions to result in thawed foodstuff, freezing said thawed foodstuff to result in a multiply frozen foodstuff, subsequently thawing multiply frozen foodstuff under conditions to result in a multiply frozen and thawed foodstuff; and removing moisture from multiply frozen and thawed foodstuff under conditions to produce a finish-dried foodstuff having a storage stable moisture content of less than about 12% by total weight and exhibiting a Rehydration Ratio representing the replacement of at least 95% of previously removed moisture after reconstitution for less than about 10 minutes in simmering 205° F. water.

36 Claims, No Drawings

ID
METHOD FOR PREPARING QUICK-RECONSTITUTING FOODSTUFFS WHICH INCLUDES SUBJECTING SUCH FOODSTUFFS TO FREEZING FOLLOWED BY THAWING AND THEN AT LEAST ONE SEQUENCE OF FREEZING AND THAWING PRIOR TO DRYING

AUTHORIZATION PURSUANT TO 37 C.F.R. § 1.71(d)(e)

A portion of the disclosure of this patent document, including appendices, may contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The present invention relates to a method of producing dehydrated foodstuffs capable of quick or rapid reconstitution. More particularly, the present invention is directed to a process for processing vegetable material which includes steps of cooking, freezing, thawing, and dehydration carried out under controlled conditions wherein the vegetable material is subjected to a sequence of freezing and thawing at least twice. The present invention is also directed to a process for producing dehydrated vegetables capable of quick or rapid reconstitution or rehydrating by a process which involves subjecting foodstuff, such as vegetable material, i.e., potatoes, to freezing followed by thawing and then at least one additional sequence of freezing and thawing prior to drying.

2. Description of the Prior Art

Dehydration is one of the oldest methods for preserving food. Commercial production of dehydrated foods, however, is a development of the twentieth century. During the last fifty years, many procedures have been developed in an attempt to produce dehydrated products which upon reconstitution resemble fresh foods in taste, texture, and appearance. More recently there has been a general concern for rehydrating large piece products. Most of these efforts have resulted in unsatisfactory processes and products. A problem common to prior dehydration methods is a phenomenon referred to as case-hardening or the formation of a horny, vitreous material primarily on the surface of the foods. It has been postulated that this may result from the collapse of the cellular structure of the vegetable which dehydrates into a dense mass of material of low rehydration characteristics.

U.S. Pat. No. 4,889,734, commonly owned with the present invention, is an example of more recent efforts to produce quick-reconstituting foodstuffs wherein the foodstuff is frozen prior to being dehydrated.

U.S. Pat. No. 2,278,472 discloses advantages of freezing food prior to dehydration.

U.S. Pat. No. 2,707,684 discloses that if potato pieces are rapidly frozen prior to dehydration, the final products will have a slow rehydration rate.

U.S. Pat. No. 2,713,003 preconditions food products by freezing, throughout or superficially, prior to dehydrating.

U.S. Pat. No. 2,729,566 discloses a process which involves rapid freezing followed by a slow thawing.

U.S. Pat. No. 3,188,750 attempts to produce a dehydrated product possessing a high degree of biological integrity by first hot air drying raw material prior to freeze drying which is preferably followed by another hot air drying.

U.S. Pat. No. 3,359,123 is directed to rendering potatoes more amenable to freeze-thaw procedures by a controlled cooking procedure followed by dehydrating the product.

U.S. Pat. No. 3,573,070 discloses a process which comprises freezing prior to combined freeze drying-hot air drying in an attempt to produce improved dehydrated products.

U.S. Pat. No. 3,644,129 is based on the discovery that combined freeze drying-hot air drying is effective in improving the rehydration characteristics of the dehydrated product.

The foregoing disclosures are examples of attempts made to overcome shortcomings of dehydrated food products as compared to freshly prepared foodstuff. The food industry has had to rely on similar procedures to prepare dehydrated vegetable over the years. Cooking and eating habits have been influenced by a number of factors which reduce the time allocated for food preparation in households as well as in eating establishments. This has caused a need for good nutritious foods which can be prepared quickly and easily. Notwithstanding, numerous efforts to develop industrially produced and commercially acceptable dehydrated food products, there is a limited number of dehydrated vegetable products on the market. Such vegetables are primarily used as flavoring in soups, stocks, casseroles, and the like. Moreover, dehydrated vegetables used in instant soups, i.e., having a reconstitution time of less than about 10 minutes, have been small in size in order to permit preparation within the prescribed time period. Normally the vegetable piece size is no larger than about ⅛ inch in cross section. Typically, the dehydrated products have been reduced to a powder. Complaints about such products include that the dehydrated pieces reconstitute incompletely and are tough and chewy despite their small size. Larger vegetable pieces have only recently been used as ingredients in commercial mixes containing dehydrated vegetables, stock seasoning, and noodles. These mixes are used as starting materials for preparation of soup to which only water and meat need be added in the kitchen. Their recipe normally requires as long as ½ to 1½ hours in preparation for consumption.

Those concerned with these and other problems recognize the need for an improved dehydrated foodstuff capable of quick or rapid reconstitution or rehydration.

BRIEF SUMMARY OF THE INVENTION

The present invention, intended to be claimed, relates generally to the production of dehydrated food materials and preferably vegetable material, such as potatoes. More particularly the invention is directed to a process for dehydrating vegetable materials which are capable of quick or rapid rehydration in water to more closely resemble the taste, texture, and appearance of fresh vegetables than heretofore has been commercially achieved.

It is believed that the advantages of the present invention are achieved by subjecting frozen foodstuff, preferably from which essentially no moisture has been artificially removed, to processing steps which include thawing, followed by at least one sequence of freezing at a temperature within the range of about −100° F. to about 30° F. for a time within a range of about one-tenth hour to more than 6 months followed by thawing in a fluid medium at about 130° F. to about 28° F. for about 3 minutes to about 72 hours before dehydration.

For purposes of the present invention, the initial freezing may be conducted at a temperature within the range of about −100° F. to +30° F., preferably within the range of about −20° F. to about 20° F. for up to about 120 minutes, and most preferably at about 0° F. for about 90 minutes, particularly where the initial thawing step is performed soon after the initial freezing. For example, freezing the food material can be accomplished by exposing foodstuff to an atmosphere having a temperature between about −40° F. to +30° F. for about 30 minutes up to about 120 minutes or until the product is frozen throughout; and individual quick freezing (IQF) procedures are most preferable. The frozen foodstuff may be stored under frozen storage conditions for a time up to about six (6) months, or longer, prior to being thawed in accordance with the present invention.

In accordance with the present invention, the thawing steps may be conducted in a fluid media, such as a gaseous media, a liquid media, an organic particulate media, or an inorganic particulate media. The initial thawing may be conducted in a gaseous medium at a temperature of about 30° F. to about 130° F. for about 36 hours to about 5 minutes, and most preferably at about 100° F. for about 90 minutes. The initial thawing may be conducted in a liquid medium at a temperature of about 28° F. to about 120° F. for about 18 hours to about 3 minutes and most preferably at about 60° F. for about 40 minutes.

Subsequent sequences of freezing and thawing may be carried out by freezing at a temperature within the range of about −20° F. to about 20° F., and most preferably at about 0° F., for a time within a range of about 30 minutes to 120 minutes, and most preferably about 90 minutes, followed by thawing. Subsequent thawing may be conducted in a gaseous medium at a temperature within the range of about 30° F. to about 130° F., and most preferably about 85° F., for a time within the range of about 36 hours to about 5 minutes, and most preferably about 60 minutes. Also, subsequent thawing may occur in a fluid media at a temperature within the range of about 28° F. to about 120° F. for about 18 hours to about 3 minutes and most preferably at about 60° F. for about 40 minutes.

The present invention is particularly advantageous in that frozen foodstuff may be stored under frozen storage conditions for extended time periods, e.g., up to 6 months or longer, before being subjected to any of the thawing steps in accordance with the present invention. For example, the foodstuff may be frozen, and stored under frozen storage conditions, prior to being thawed and then subjected to subsequent freezing and thawing in accordance with the present invention prior to dehydration. Thus, the present invention is particularly advantageous in that frozen foodstuff, subjected to thawing and freezing in accordance with the present invention, may be stored for extended periods of time, e.g., up to six months or longer, before being thawed prior to dehydration.

Accordingly, substantially fresh foodstuff may be frozen and stored in the frozen state, or frozen, thawed, frozen and stored in the frozen state, before being subjected to the subsequent thawing steps in accordance with the present invention, instead of being thawed substantially immediately after freezing in accordance with the present invention.

In accordance with the present invention, a gaseous medium may be used during dehydration, which preferably has a dry bulb temperature higher than about 70° F. to as high as 200° F. as long as the temperature of the foodstuff is less than about 140° F. and preferably about 130° F. and dehydrating the foodstuff is conducted to a storage stable moisture content of less than about 12% by total weight, preferably of less than about 8% total weight. Higher piece temperatures will cause heat discoloration and cell expansion where cell porosity is lost resulting in poor rehydration attributes because of the formation of a vitreous, dense mass.

Preliminary to freezing, the foodstuff may be subjected to thermal treatments to raise the internal temperature of the foodstuff to within a temperature range of about 130° F. to about 220° F. for a time within a range of about 3 minutes to about 40 minutes. The thermal or heat treatments at this stage of the process may be selected from the group consisting of blanching, precooking and cooking. Preferably, the thermal treatments are conducted in an aqueous environment at temperatures above about 120° F. to as high as about 200° F.–212° F.

Foodstuff which is suitable for purposes of the present invention include vegetable materials, such as potatoes, sweet potatoes, parsnips, turnips, beets, beans, peas, peppers, onion, corn, barley, rice, and wheat; and fruit materials, such as apples, peaches, bananas and water melons.

Particularly good results are achieved when potatoes, processed in accordance with the present invention, are subjected to a double sequence of freezing and thawing prior to being dried.

The products produced in accordance with the present invention exhibits reconstitution properties and characteristics which are not exhibited by dehydrated vegetables currently available in the market. The dehydrated product of the present invention is porous throughout its interior as well as on its exterior surface. It exhibits neither a shrunken appearance typical of conventionally dried vegetables nor an expanded or puffed shape often associated with food materials which have been subjected to the specialized techniques of previous attempts to manufacture quick rehydrating food products. Moreover, the quick rehydrating vegetable products of the present invention can be produced in larger sizes than heretofore was thought possible for products for which there is a concern for rehydration time. Upon rehydration the product reconstitutes rapidly within about 10 minutes to a uniform degree. The resultant product does not exhibit objectionable firm, chewy interiors and mushy exterior surfaces which tend to slough during reconstitution as is typically the case with conventionally dried products.

The products of the present invention have been found to be particularly useful in preparation for side dishes, salads, baked, fried, and grilled products, and in stews and soups which, in contrast to commercially available products require upwards of 90 minutes to reconstitute, can be essentially completely rehydrated in preparation for consumption in less than about 10 to 15 minutes.

Accordingly, the many advantages realized by the practice of the present invention include the production of foodstuff, such as dehydrated vegetables, i.e., potatoes which rapidly rehydrate to replace at least 90% and preferably 95% to 100% of the previously removed moisture in less than about 15 minutes.

A further advantage is that dehydrated vegetables, i.e., potatoes, having a minimum dimension as large as about 1–1½ inch, and most preferably about ⅝ inch to about ¾ inch, can be produced which are capable of such rapid rehydration.

Another further advantage of the present invention is that substantially whole potatoes, which may include all or at least some peel, having a minor diameter of less than about 1–1½ inches may be processed without the need to be divided into pieces.

Another advantage of the present invention is that a process for dehydrating foodstuff is provided wherein resultant product, i.e., finish-dried foodstuff, comprises less than about 25% by total weight of finished dried foodstuff comprising case-hardened vitreous material.

Another advantage of the present invention is that the yield as measured by the rehydration ratio is about 10 percent higher than the single freeze/thaw procedure.

An object of the present invention is to produce quick rehydrating potatoes having shapes and sizes varying from substantially whole potatoes having a minor dimension of less than about 1–1½ inches, ⅛ inch slices to 1 inch dice, including ¼ inch slices, ⅜ inch dice, shreds, ⁹⁄₃₂ inch strips, ¾ inch×¾ inch×½ inch strips and 1 inch×¾ inch×⅝ inch strips as well as naturally symmetrical shapes up to 1½ inches in diameter.

It is, thus, an object of the present invention to produce dehydrated food products which, when reconstituted, closely resembles the taste, texture, and appearance of its fresh food counterpart.

Still another object of the present invention is to provide a dehydrated food product which is substantially completely reconstituted by a process comprising rehydrating the dehydrated foodstuff in an aqueous medium to replace at least about 90%, and preferably at least 95% to 100%, of the moisture previously removed by the dehydration process.

A further object of the present invention is to provide a method for dehydrating foodstuff to a storage stable moisture content of less than about 12% by total weight, preferably of less than about 8% total weight in less than about 12 hours total processing time.

And yet another object of the present invention is to produce dehydrated foodstuff having a storage stable moisture content of less than about 12% by total weight and exhibiting a Rehydration Ratio representing a replacement of at least 90% of previously removed moisture after reconstitution for less than about 10 minutes in simmering water.

Another object of the present invention is to produce dehydrated food products essential devoid of a case-hardened interior, and exhibits a substantially uniform texture.

To these ends, an object of the present invention is the provision of improved methods for preparing quick-reconstituting foodstuffs which includes subjecting such foodstuffs to a multiple sequence of freezing and thawing prior to drying.

DETAILED DESCRIPTION OF THE INVENTION

The following is a more detailed description of the present invention which is intended to be claimed.

Preliminary to carrying out the process of the present invention the foodstuff, which is preferably vegetable material, is normally cleaned of dirt and debris, peeled, and trimmed if necessary, prior to dividing into pieces if so desired.

While selected vegetable material, such as potatoes, having a minor dimension of less than about 1–1½ inches, grains and legumes can be processed whole, it is preferable to divide large vegetables, e.g., having a minor diameter of greater than about 1½ inches such as potatoes, into pieces, such as slices, dices, or strips. Although the invention is applicable to a variety of foodstuff, and vegetables in particular, the best mode presently contemplated for carrying out the process shall be described herein in full, clear, concise, and exact terms in connection with Russet Burbank potatoes and treatment parameters, such as temperature and time, which are designated as being most preferred are used in processing such potatoes. It should be recognized, however, that certain treatment parameters may vary depending on the size and the particular material being processed.

Potatoes were cut into large pieces, such as ⅜ inch cut tri-wedges, and pieces having a size of about ½ inch× ¾ inch×¾ inch. The potatoes may also be cut into pieces having other shapes and sizes such as ¾ inch die, in addition to slices and strips. The potato pieces are then subjected to treatments comprising heating with steam or water having a temperature within the range of about 120° F. to 212° F. and preferably between about 165° F. to 200° F. and most preferably 170° F. for between 3 to 75 minutes, and most preferably 20 minutes cooling in tap water to a temperature below about 80° F. and most preferably room temperature.

Particularly good results were achieved when ⅜ inch×tri-wedge potato pieces were subjected to a heat treatment for 20 minutes in water having a temperature of about 170° F. and cooled in water having a temperature of about 60° F. for 20 minutes to room temperature.

The purpose of heat treatment is to raise the internal temperature of the foodstuff to within a temperature range of about 130° F. to about 220° F. for a time within a range of 3 minutes to about 40 minutes. The thermal or heat treatments at this stage of the process may be selected from the group consisting of at least one of blanching, precooking and cooking, as these treatments are conventionally understood in the food industry, and particularly by those skilled in potato processing technology.

For example, blanching is normally performed to inactivate enzymes, reduce microbial population, and minimize discoloration that may otherwise occur. However, blanching also has an effect on the swelling and gelatin of starch grains of potatoes. Inasmuch as potatoes have different characteristics depending on a number of factors including the growing location and storage time and conditions, considerable changes may be made in blanching conditions. In general, however, potatoes may be blanched at a temperature of at least about 130° F. for a time of at least about 10 minutes.

Precooking is a heat treatment to which potatoes are subjected prior to cooking at a higher temperature in order to influence the texture of the reconstituted potato product. Conventional conditions for precooking include a temperature of about 160° F.–165° F. for a time of about 20 minutes.

Cooking is a conventional treatment conducted under conditions such as a temperature of about 212° F. for a time effective to result in a mealy texture.

Intermediate conventional precooking and cooking, potatoes are conventionally cooled, e.g., in water to below about 75° F. for at least 15 minutes, which reduces the "blue value", i.e., measure of free starch, of precooked potatoes.

Precooking, cooling and cooking are standard procedures in processes for producing mash potato products, such as potato flakes.

Preferably, the heat treatment involves an initial heat treatment selected from the group consisting of blanching and precooking, and a sequence of blanching and precooking at a temperature within the range of about 130° F. to about 190° F. for a time within the range of about 10 minutes to about 40 minutes. The conditions of such initial heat treatment more preferred for purposes of the present invention include a temperature within a range of about 140° F. to about 180° F., and a time within a range of about 15 minutes to about 25 minutes being most preferred.

A subsequent heat treatment in accordance with the present invention comprises cooking and preferably conducted at a temperature within a range of about 165° F. to about 220° F. for a time within a range of about 3 minutes to about 40 minutes. More preferred cooking conditions include a temperature within a range of about 170° F. to about 210° F. for a time within a range of about 175° F. to about 185° F. being most preferred.

For purposes of the present invention, potatoes are cooled intermediate the initial heat treatment and the subsequent heat treatment under cooling conditions including a temperature within a range of about 40° F. to about 95° F. for a time within the range of about 10 minutes to about 40 minutes.

More preferred cooling conditions include a temperature within a range of about 50° F. to about 80° F. for a time within a range of about 15 minutes to about 25 minutes, with a temperature within a range of about 60° F. to about 70° F. for a time within a range of about 60° F. to about 70° F. being most preferred.

Generally the nature of the raw material being processed will determine which of these treatments alone or in combination will be used. For potatoes, superior results are achieved with this sequence of steps.

Potatoes and other vegetable material may also be treated with solutions containing agents to reduce discoloration and minimize stickiness of the product prior to the dehydration step without adversely affecting the quality of the finished product. Although minimizing stickiness may be accomplished by surface drying the foodstuff, care must be taken to avoid removing significant amounts of natural moisture from the product prior to processing in accordance with the present invention. Otherwise case-hardening is likely to occur and the quality of the product reconstituted from the finished dried state is adversely affected.

In accordance with the present invention, a preservative or antioxidant treating agent, such as a sodium meta bisulphite or other soluble $SO_2$ containing salt solutions, may be employed to inhibit the tendency for the dehydrated product to brown and develop off-flavors. Likewise, in addition to the bisulphite treatment, other agents such as are capable of arresting the browning tendencies and other oxidative phenomena experienced during processing, handling, packaging and storing of the dehydrated product may be employed. For example, such antioxidants as the butylated huydroxyanisole or butylated hydroxytoluene type compounds, as well as other water soluble antioxidants, may be sprayed on the product after dissolution in an alcohol. Also, it is entirely within the scope of the present invention that flavoring components and other treating agents such as may be functional to either enhance the processability and yield, storageability or protectability of the final dehydrated product as well as the palatability of the rehydrated product may be employed.

The moisture content of potato pieces are typically within the range of about 79.5% to 82% by total weight prior to the removal of any moisture therefrom. For example, ½ inch×¾ inch×¾ inch Russet Burbank dice may have a moisture content of about 81% by total weight prior to being subjected to a sequence of multiple freeze-thaw cycles before dehydration in accordance with the present invention. Typical moisture contents based on total weight of other vegetables before any dehydration occurs includes: sweet potatoes, about 83%; bell peppers, about 81%; Red Pontiac potatoes, about 85%; White Rose potatoes, about 85%. As is generally known, however, the natural moisture contents of all vegetables vary within ranges. The *Composition of Foods; Raw, Processed and Prepared*, Agricultural Handbook No. 8, Agricultural Research Service, U.S.D.A., U.S. Government Printing Office, Washington, D.C. 20402 sets forth the moisture content ranges for a variety of food materials including those which can be processed in accordance with the present invention.

It has been discovered that particularly good results were achieved when potato pieces, as well as other vegetables, are subjected to a sequence of two freeze-thaw cycles prior to any significant dehydration taking place. In this preferred embodiment, the potato pieces, at essentially their natural moisture levels except for moisture lost during storage and handling, are frozen then thawed, and then again frozen and thawed, prior to dehydrating.

Although freezing may be carried out in a number of ways, immersion freezing in a refrigerated liquid or brine is least preferred. While tunnel or blast freezing at temperatures between about −20° F. to +20° F. may be used, it is preferred to subject potatoes to cold air having a temperature of −20° F. to 0° F. in a freezing chamber such as a spiral freezer, for at least about 45, and preferably 60 to 120 minutes until the product is frozen throughout. Although the sequence of multiple freeze-thaw cycles preliminary to drying is important to the process of the present invention, the particular manner by which the foodstuff is frozen is not critical. It has been found that any expedient for freezing can be used with minimal affect on the characteristics of the final product if the frozen foodstuff is allowed to equilibrate at −10° F. to 10° F. for about 24 hours or longer prior to subsequent thawing and/or freezing/thawing procedures in accordance to the present invention subsequently subjected to dehydration in an atmosphere having dry bulb-wet bulb temperatures as herein described. However, individual quick freezing (IQF) procedures are most preferred.

For purposes of the present invention, the initial freezing is conducted at a temperature within the range of about −20° F. to about 20° F. for up to about 120 minutes and preferably about 30 minutes, and most preferably at about 0° F. for about 90 minutes, particularly where the initial thawing step is performed soon after the initial freezing, i.e., less than about two to about four weeks after freezing. The initial thawing is conducted in a gaseous medium at a temperature of about 30° F. to about 130° F. for about 36 hours to about 5 minutes, and most preferably at about 100° F. for about 90 minutes, particularly where the initial thawing step is performed soon after the initial freezing. The initial thawing may be conducted in a fluid medium at a temperature of about 28° F. to about 120° F. for about 18 hours to about 3 minutes and most preferably at about 60° F. for about 40 minutes.

Subsequent sequences of freezing and thawing may be carried out by freezing at a temperature within the range of about −20° F. to about 20° F., and most preferably at about 0° F., for a time of up to about 120 minutes, and preferably a time within a range of about 30 minutes to 120 minutes, and most preferably about 90 minutes, followed by thawing. In accordance with the present invention, thawing is preferably conducted in a fluid media. Accordingly, thawing may be conducted in a gaseous media at a temperature within the range of about 30° F. to about 130° F., and most preferably about 85° F., for a time within the range of about 36 hours to about 5 minutes, and most preferably about 60 minutes. Also, the thawing may occur in a liquid media at a temperature within the range of about 28° F. to about 120°

F. for about 18 hours to about 3 minutes and most preferably at about 60° F. for about 40 minutes, and thawing in a liquid media is preferred for subsequent thawing.

The present invention is particularly advantageous in that the frozen foodstuff may be stored under frozen storage conditions for extended time periods, e.g., up to about 6 months or longer, before being thawed and then subjected to subsequent freezing and thawing in accordance with the present invention prior to dehydration. Thus, either initially frozen or subsequently frozen food- stuff may be stored for extended periods of time, e.g., up to six months or longer, before being thawed prior to dehydration.

The foodstuff at essentially its natural moisture content which has been subjected to a critical sequence of at least two freeze-thaw procedures is dried by a gaseous medium during dehydration, which preferably has a dry bulb temperature higher than about 90° F. to as high as 200° F. with a relative humidity of about 0% to more than 90% as long as the temperature of the foodstuff is less than about 140° F. and preferably about 130° F. and dehydrating the foodstuff is conducted to a storage stable moisture content of less than about 12% by total weight, preferably of less than about 8% total weight. Higher piece temperatures will cause heat discoloration and cell expansion where cell porosity is lost resulting in poor rehydration attributes because of the formation of a vitreous, dense mass. In accordance with the present invention, however, it is most preferred to dehydrate at about 130° F. for about 4 hours.

It has been found that dehydration under the foregoing conditions subsequent to a sequence of freeze-thaw cycles substantially eliminates case-hardening of the product which can result from conventional drying. Conventional hot-air drying progressively removes water first from the surface and, only when the exterior is substantially dry, from the interior of the potato. Case-hardening of the product is to be avoided because such condition reduces and ultimately substantially inhibits the migration of water from the interior to the exterior of the product. Thus, dehydration to a storage-stable moisture level is extremely slow and scorching is a concern. The case-hardened surface also adversely affects rehydration characteristics. Because the surface is not porous but rather exhibits an impervious skin, prolonged soaking is required in order for water to reconstitute the interior of the product. Often this condition prevents complete rehydration within the prescribed time. Incompletely rehydrated products exhibit firm, chewy centers and surfaces which are prone to sloughing. All of such characteristics are to be avoided.

Although not wishing to be bound by any particular theory, the multiple freeze-thaw cycles prior to dehydration procedure of the present invention is believed to prevent case-hardening by promoting uniform moisture removal from throughout the product. By uniformly dehydrating the foodstuff, the natural passages provided by the interstitial spaces between the cells and the porous condition of the product affected by freezing does not become shrunken or clogged at the surface. The moisture, therefore, can freely pass from the interior of the piece through the exterior surface to rapidly dehydrate the product. Although porosity is an essential characteristic in the resultant product, excessive puffing or expansion of the product during dehydration is to be avoided because attendant cell rupture releases soluble solids such as starches and sugars contained within the cell. Upon subsequent reconstitution these solids are readily solubilized and are leached from the food material being rehydrated. It has been found that such objectionable features are avoided by subjecting foodstuff to the sequence of multiple freezing and thawing cycles followed by dehydration, in accordance with the present invention, which is believed to be responsible for the desired attributes of the products of the present invention.

The potato pieces and other vegetables are finished dried. Due to the effects of prior treatments, the potato pieces have been sufficiently conditioned so that the particular expedient used for dehydration to a storage-stable moisture content is not a major concern. It has been discovered that exposing the potatoes and other vegetables to a hot atmosphere until a storage-stable moisture content is achieved produces an end product with suitable characteristics. For example, hot air dehydration of the product in a stationary bed, preferably at temperatures below about 130° F. to storage stable moisture contents of less than about 12% by total weight, result with particularly good products upon reconstitution. The potato pieces are finish dried to a moisture content of about 12% to 6% by total weight in air having a dry bulb temperature within the range of about 200° F. to 90° F. with the relative humidity being between about 0% to more than 90 %. Finish drying using a stationary bed, continuous belt dryer is completed in less than about 8 hours and typically in about 3 to 5½ hours and most preferably in about 4 hours. The potato pieces which have been subjected to multiple freeze-thaw cycles were finished dried to a moisture content based on total weight of about 7% by subjecting the pieces to air having a dry bulb temperature of about 130° F. for about 4 hours.

The dehydrated potato pieces having a storage stable moisture content were packaged in a conventional manner for handling and storage purposes. To prepare the dehydrated foodstuff of the invention for consumption, the product is merely placed in water and permitted to stand until essentially reconstituted and heated. Particularly good results are achieved when water having a temperature within the range of about 35° F. to 200° F. is added to the dehydrated foodstuff or the product is added to water which is brought to a boil and simmered for up to 3 to 10 minutes.

The potatoes and other vegetables prepared in this manner are essentially completely reconstituted and have a taste, texture, appearance, and other organoleptic characteristics more closely resembling vegetables prepared directly from the fresh state than heretofore has been commercially available. The reconstituted potato makes excellent soups, stews, sauces, casseroles, side dishes, salads and deep fat, grilled and baked foodstuff.

In addition to the high quality of the food products made in accordance with the present invention, they are also quick rehydrating. For purposes of the present invention, quick rehydrating means reconstitution of the dehydrated product in less than about 10 minutes to a moisture content closely approaching the moisture content of the raw material from which it was made. Replacement of at least 90% of the water is required in order for the product to resemble its fresh food counterpart. Preferred results are achieved with the replacement of greater than about 95%, more preferably greater than about 98%, and most preferably greater than about 99% of moisture which has previously been removed. For purposes of the present invention, the Rehydration Ratio and Moisture Replacement Value represent the replacement or percentage of previously removed moisture, e.g., expressed in the previously listed percentages, after reconstitution for less than about 10 minutes in simmering 205° F. water. The conditions of this reconstitution have been chosen as standard conditions for purposes of determining Moisture Replacement Values for products of the present invention. Actual reconstitution conditions, and particularly temperature and time, may vary. Moisture replacement can be expressed in terms of a moisture replacement value, i.e., percent (%), and the rehydration ratio of the product. Rehydration Ratio, i.e., R.R., is determined by weighing a quantity of dehydrated product, rehydrating such product in water, draining the product of free water, and weighing the rehydrated product. As used herein, rehydration ratio is calculated by dividing the weight of the product after rehydration by the weight of the product in its dehydrated state.

Upon reconstitution, vegetables which have been dehydrated in accordance with the present invention exhibit rehydration ratios which are substantially higher than their conventionally dehydrated counterparts. Rehydration ratios for dehydrated vegetables of the present invention which represent a replacement of at least about 95% of the moisture which had previously been removed during dehydration are listed below:

TABLE I

| Vegetable | Rehydration Ratio (R.R.) |
|---|---|
| Russet Burbank Potatoes | 4.8 to 5.3 |

The potato pieces, dehydrated and otherwise processed in accordance with the present invention as described above to a final moisture content of about 7% by total weight were held in water that had been brought to a 205° F. boil for 12 minutes. The reconstituted potato pieces having dimensions of about tri-wedge×3/8 inch were determined to have a Rehydration Ratio of 5.1. This product was considered excellent in taste, texture, and appearance and exhibited no sign of sloughing.

COMPARISON

In order to compare various products made in accordance with the present invention with what is commercially available in the marketplace, and procedures including a single freeze-thaw cycle prior to dehydration, the following tests were conducted:

PRODUCTS MADE BY THE INVENTION

Sample A

Idaho Russet Burbank potatoes were peeled and cut into tri-wedge by 3/8 inch pieces. The pieces were precooked in water at 170° F. for 20 minutes, cooled in 55° F. water for 20 minutes, and frozen for 120 minutes at 0° F. The frozen pieces at essentially their natural moisture content of about 81% by total weight were thawed in an air environment at 100° F. for 90 minutes, and frozen again at 0° F. for 90 minutes, then thawed again in an air environment at 85° F. for 60 minutes prior to being finish dried in air at a temperature of about 130° F. dry bulb to a storage stable moisture content of about 7% by total weight in about 4 hours. Total freeze/thaw processing time is about 6 and one-half hours.

Sample B

In an other example Idaho Russet Burbank potatoes were peeled and cut into tri-wedge by 3/8 inch pieces. The pieces were precooked in water at 170° F. for 20 minutes, cooled in 55° F. water for 20 minutes, and frozen for 120 minutes at 0° F. The frozen pieces at essentially their natural moisture content of about 81% by total weight were thawed in a water environment at 60° F. for 40 minutes, frozen again at 0° F. for 120 minutes, then thawed again in a water environment at 60° F. for 25 minutes prior to being finish dried in air at a temperature of about 130° F. dry bulb to a storage stable moisture content of about 7% by total weight in about 4 hours. Total freeze/thaw processing time is about 5 hours.

Product Made By Prior Art

Sample C

Idaho Russet Burbank potatoes were peeled and cut into tri-wedge by 3/8 inch pieces. The pieces were precooked in water at 170° F. for 20 minutes, cooled in 55° F. water for 20 minutes, and frozen for 4 hours at 0° F. The frozen pieces at essentially their natural moisture content of about 81% by total weight were thawed in a water environment at 60° F. for 40 minutes prior to being finish dried in air at a temperature of about 130° F. dry bulb to a storage stable moisture content of about 7% by total weight in about 4 hours. The total freeze/thaw time is about 4 3/4 hours.

Sample D

In an other example Idaho Russet Burbank potatoes were peeled and cut into tri-wedge by 3/8 inch pieces. The pieces were precooked in water at 170° F. for 20 minutes, cooled in 55° F. water for 20 minutes, and frozen for 90 minutes at 0° F. The frozen pieces at essentially their natural moisture content of about 81% by total weight were thawed in an air environment at 38–42° F. for 5 hours prior to being finish dried in air at a temperature of about 130° F. dry bulb to a storage stable moisture content of about 7% by total weight in about 4 hours. The total freeze/thaw time is about 6½ hours.

The dehydrated vegetable products made in accordance with the invention as described above as well as the conventional freeze/thaw dehydrated vegetables were reconstituted for purposes of this comparison in an identical manner. Twenty-five grams of each dehydrated product was added in a separate container to 400 grams of 205° F. boiling water and allowed to simmer for the time listed in the table below. After simmering for the prescribed times, the potatoes were removed from the water drained and weighed again.

Using the raw percent moisture and dehydrated percent moisture, the replacement of previously removed moisture (Moisture Replacement Value) may be calculated. For example, if the raw moisture is 81% and the dehydrated moisture is 7%, the percent replacement of previously removed moisture may be calculated to be 100% when the rehydration ratio is 4.9.

Each sample made in accordance with the invention as described above as well as the conventional freeze/thaw dehydrated potatoes were sorted for removal of any pieces containing dense, vitreous material which have undesirable rehydration characteristics. The percent of dense, vitreous material was calculated in each case.

The results are tabulated below:

TABLE II

| | 6 ½ Hour Freeze/Thaw Process by Invention Sample A | Conventional 6 ½ Hour Freeze/Thaw Process Sample C | 5 Hour Freeze/Thaw Process by Invention Sample B | Conventional 4 ¾ Hour Freeze/Thaw Process Sample D |
|---|---|---|---|---|
| 10 Minute Simmer Moisture Replacement Value | 100 | 89 | 98 | 88 |

TABLE II-continued

| | 6 ½ Hour Freeze/Thaw Process by Invention Sample A | Conventional 6 ½ Hour Freeze/Thaw Process Sample C | 5 Hour Freeze/Thaw Process by Invention Sample B | Conventional 4 ¾ Hour Freeze/Thaw Process Sample D |
|---|---|---|---|---|
| Percent Vitreous Material | 3.1 | 74.1 | 4.6 | 74.3 |

Tabulated data indicates that each sample of vegetable processed in accordance with the present invention exhibits a percent replacement of previously removed moisture that is consistently higher than their counterparts dehydrated in a procedure involving a single freeze/thaw cycle. It is generally recognized that rehydrated products which have higher Moisture Replacement Value, i.e., higher than about 95%, more closely resemble the fresh material from which it is made. Also the tabulated data indicates that the quantity of vitreous material is greatly reduced with the present invention when compared to procedures involving a single freeze-thaw cycle having comparable total freeze/thaw processing times. This discovery greatly enhances the commercial viability of the invention.

From the foregoing description, one skilled in the art can easily ascertain the essential characteristics of this invention and, without departing from the spirit and scope thereof, can make various changes and modifications of the invention to adapt it to various usages and conditions.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. A method for producing a quick-reconstituting foodstuff comprising:

thawing previously frozen foodstuff under thawing conditions to result in thawed foodstuff;

freezing said thawed foodstuff under freezing conditions to result in a multiply frozen foodstuff;

subsequently thawing multiply frozen foodstuff under subsequent thawing conditions to result in a multiply frozen and thawed foodstuff; and removing moisture from multiply frozen and thawed foodstuff under dehydrating conditions to produce a finish-dried foodstuff having a storage stable moisture content of less than about 12% by total weight and exhibiting a Rehydration Ratio representing the replacement of at least 90% of previously removed moisture after reconstitution for less than about 10 minutes in simmering 205° F. water.

2. The method for producing a quick-reconstituting foodstuff in accordance with claim 1 wherein said thawing conditions comprise a temperature of about 30° F. to about 130° F. and a time within a range of about 5 minutes to about 36 hours.

3. The method for producing a quick-reconstituting foodstuff in accordance with claim 2 wherein said freezing conditions comprise a temperature of about –20° F. to 20° F. and a time within a range of about 30 minutes to about 120 minutes.

4. The method for producing a quick-reconstituting foodstuff in accordance with claim 3 wherein said subsequent thawing conditions comprise a temperature of about 30° F. to about 130° F. and a time within a range of about 5 minutes to about 36 hours.

5. The method for producing a quick-reconstituting foodstuff in accordance with claim 4 comprising freezing foodstuff at a temperature within the range of about –20° F. to about 20° F. for up to about 120 minutes to result in said previously frozen foodstuff.

6. The method for producing a quick-reconstituting foodstuff in accordance with claim 5 wherein said freezing conditions comprise a temperature of about 0° F. and a time within a range of about 90 minutes.

7. The method for producing a quick-reconstituting foodstuff in accordance with claim 1 comprising freezing potatoes at a temperature within the range of about –20° F. to about 20° F. for up to about 120 minutes to result in previously frozen foodstuff.

8. The method for producing a quick-reconstituting foodstuff in accordance with claim 7 comprising storing said previously frozen potatoes under frozen storage conditions for a time up to about six (6) months prior to at least one step selected from the group consisting of said thawing and said subsequent thawing.

9. The method for producing a quick-reconstituting foodstuff in accordance with claim 1 wherein said removing moisture comprises dehydrating said multiply frozen and thawed foodstuff under dehydrating conditions comprising a dehydration time of less than 5 hours.

10. The method for producing a quick-reconstituting foodstuff in accordance with claim 9 wherein said dehydration time comprises in about 4 hours.

11. The method for producing a quick-reconstituting foodstuff in accordance with claim 1 comprising storing said previously frozen foodstuff under frozen storage conditions for a time up to about six (6) months prior to said thawing.

12. The method for producing a quick-reconstituting foodstuff in accordance with claim 2, wherein said thawing and said subsequent thawing are conducted in fluid media.

13. The method for producing a quick-reconstituting foodstuff in accordance with claim 12, wherein said fluid media is selected from the group consisting of gaseous media and liquid media.

14. The method for producing a quick-reconstituting foodstuff in accordance with claim 13, wherein said fluid media comprises gaseous media and said thawing conditions comprise a temperature of about 85° F. and a time of about 60 minutes.

15. The method for producing a quick-reconstituting foodstuff in accordance with claim 14, wherein said fluid media comprises liquid media and said thawing temperatures comprise a temperature within a range of about 28° F. to about 120° F. for a time within a range of about 3 minutes to about 18 hours.

16. The method for producing a quick-reconstituting foodstuff in accordance with claim 15, wherein said thawing conditions comprise a temperature of about 60° F. and a time of about 40 minutes.

17. The method for producing a quick-reconstituting foodstuff in accordance with claim 14 wherein said subsequent thawing conditions comprise a temperature of about 28° F. to about 120° F. and a time within a range of about 3 minutes to about 18 hours.

18. The method for producing a quick-reconstituting foodstuff in accordance with claim 1 wherein said foodstuff comprises potato.

19. The method for producing a quick-reconstituting foodstuff in accordance with claim 18 wherein said potato material comprises a minimum dimension of between about ¹⁄₁₀ inch to about 1½ inches.

20. The method for producing a quick-reconstituting foodstuff in accordance with claim 19 wherein said vegetable material comprises substantially whole potatoes.

21. The method for producing a quick-reconstituting foodstuff in accordance with claim 20 wherein said substantially whole potato comprise a minor diameter of less than about 1½ inches.

22. The method for producing a quick-reconstituting foodstuff in accordance with claim 21, wherein said whole potato comprises naturally occurring peel.

23. The method for producing a quick-reconstituting foodstuff in accordance with claim 19 comprising subdividing said potatoes into pieces.

24. The method for producing a quick-reconstituting foodstuff in accordance with claim 23 wherein said pieces range in size from a slice having a thickness of ⅛ inch to a 1 inch dice.

25. The method for producing a quick-reconstituting foodstuff in accordance with claim 23 wherein said pieces comprise slices having a thickness in the range of about ⅛ inch to ½ inch.

26. The method for producing a quick-reconstituting foodstuff in accordance with claim 24 wherein said pieces comprise ¾ inch×¾ inch×½ inch strips.

27. The method for producing a quick-reconstituting foodstuff in accordance with claim 18 wherein said foodstuff comprises potatoes subjected to a heat treatment at a temperature above about 130° F. prior to freezing said potatoes.

28. The method for producing a quick-reconstituting foodstuff in accordance with claim 27 wherein said heat treatment is conducted using aqueous medium.

29. The method for producing a quick-reconstituting foodstuff in accordance with claim 28 wherein said temperature is in the range of about 160° F. to 210° F.

30. The method for producing a quick-reconstituting foodstuff in accordance with claim 29 wherein said heat treatment comprises precooking.

31. The method for producing a quick-reconstituting foodstuff in accordance with claim 30 wherein said heat treatment comprises cooking.

32. The method for producing a quick-reconstituting foodstuff in accordance with claim 1, comprising:

reconstituting said finish-dried foodstuff to replace at least 95% of the previously removed moisture by simmering said finish-dried foodstuff in water for less than 10 minutes at 205° F.

33. A method for producing a quick-reconstituting foodstuff comprising:

heat treating foodstuff under heat treatment conditions including a temperature of at least about 130° F. and a time of at least about 3 minutes effective to effect an internal temperature of at least about 130° F. to produce heat-treated foodstuff;

freezing said heat-treated foodstuff to result in heat-treated and frozen foodstuff;

thawing previously heat-treated and frozen foodstuff under thawing conditions to result in thawed foodstuff;

freezing said thawed foodstuff under freezing conditions to result in a multiply frozen foodstuff;

subsequently thawing multiply frozen foodstuff under subsequent thawing conditions to result in a multiply frozen and thawed foodstuff; and removing moisture from multiply frozen and thawed foodstuff under dehydrating conditions to produce a finish-dried foodstuff having a storage stable moisture content of less than about 12% by total weight and exhibiting a Rehydration Ratio representing the replacement of at least 90% of previously removed moisture after reconstitution for less than about 10 minutes in simmering 205° F. water.

34. The method for producing quick-reconstituting foodstuff in accordance with claim 33, comprising:

reconstituting said finish-dried, twice-frozen and twice-thawed foodstuff to replace at least 95% of the previously removed moisture by simmering said finish-dried foodstuff in water for less than about 10 minutes in simmering 205° F. water.

35. A quick-reconstituting potato comprising:

dehydrated potatoes comprising less than about 25% by total weight of vitreous material, a storage stable moisture content of less than about 12% by total weight and a Rehydration Ratio representing the replacement of at least 90% of previously removed moisture after reconstitution for less than about 10 minutes in simmering 205° F. water; and wherein said dehydrated potatoes are obtained by subjecting potatoes to freezing followed by thawing and then at least one sequence of freezing and thawing prior to drying.

36. The quick-reconstituting potato of claim 35, comprising less than about 5% by total weight of vitreous material.

\* \* \* \* \*

UNITED STATES PATENT AND TRADEMARK OFFICE
CERTIFICATE OF CORRECTION

PATENT NO.  : 6,110,518
DATED       : August 29, 2000
INVENTOR(S) : Kern L. Cooper, Mark Call, Warren Simon and Susan Linscott It is certified that error appears in the above-identified patent and that said Letters Patent is hereby corrected as shown below:

<u>Title page,</u>
Item 73, Assignee, insert -- General Mills, Inc., San Francisco, CA 94111 --.

Signed and Sealed this

Second Day of October, 2001

*Attest:*

NICHOLAS P. GODICI
*Attesting Officer          Acting Director of the United States Patent and Trademark Office*